May 16, 1967
R. S. STRUNK
3,319,709
FLUID HEATER FOR THAWING FROZEN PIPE LINES
Filed Nov. 2, 1964
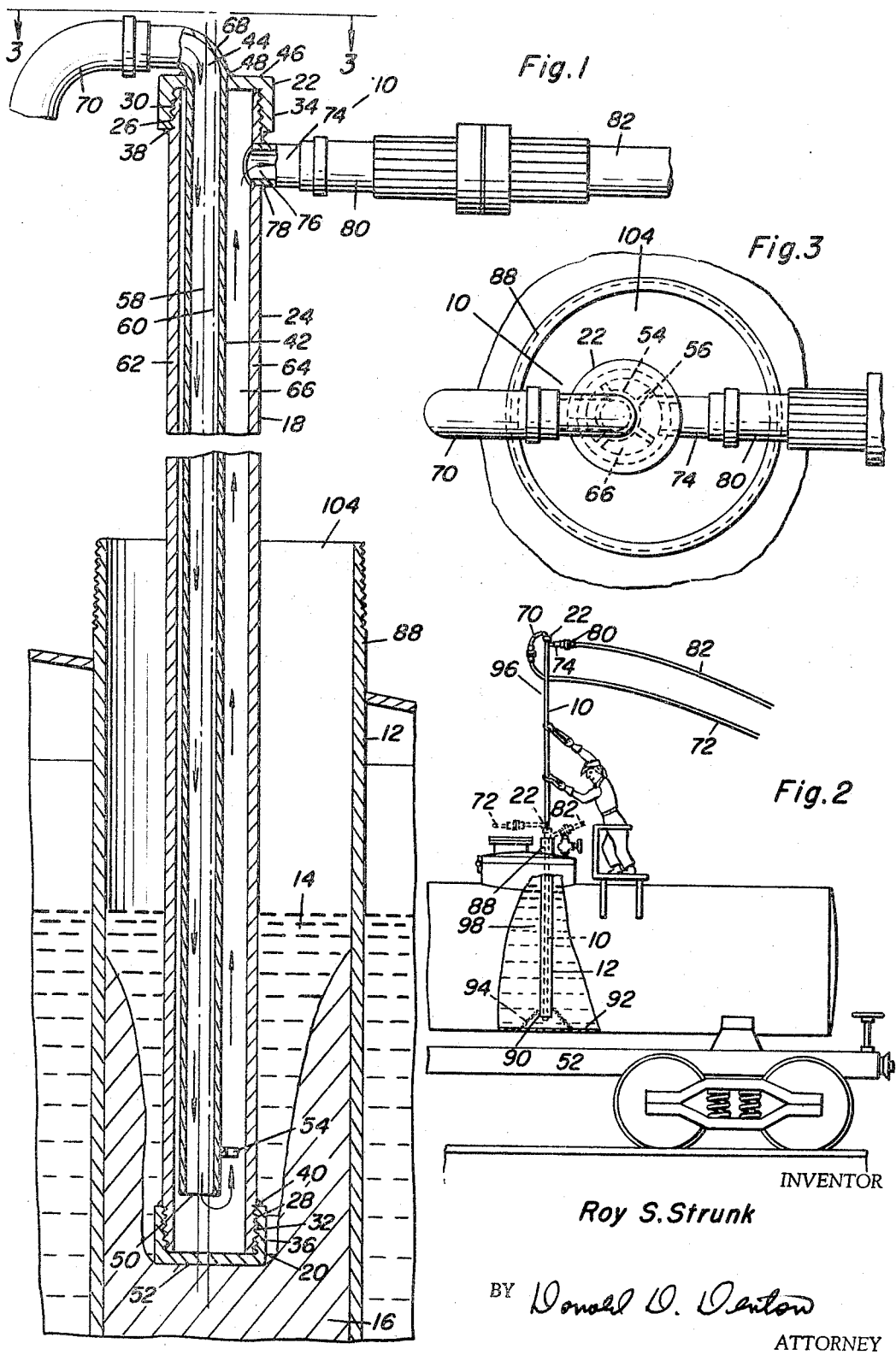
INVENTOR
Roy S. Strunk
BY Donald O. Denton
ATTORNEY United States Patent Office 3,319,709
Patented May 16, 1967

3,319,709
FLUID HEATER FOR THAWING FROZEN
PIPE LINES
Roy S. Strunk, 649 Jackson St.,
Kingsport, Tenn. 37660
Filed Nov. 2, 1964, Ser. No. 408,112
3 Claims. (Cl. 165—86)

This invention relates to a fluid heat exchanger and method for thawing frozen materials in pipe lines and the like, and more particularly to a thawing device having an elongated outer shell of high strength which can be easily inserted into and agitated within pipe lines to rapidly thaw material frozen therein without contamination of the line contents.

Liquids such as water, acids, caustics and the like, are commonly stored and transported in large tanks which often have an interior well line of tube-like construction for discharging the liquids from the tank. When the tanks are exposed in cold weather, freezing of the liquid in the well line will sometimes occur even though the liquid in the tank, itself, will not be frozen because of its larger volume. Once frozen, it is very difficult to free ice or other frozen liquid from within the well lines. Consequently, costly production delays and manpower expense often result from the necessity to thaw the line.

Attempts have been made to thaw these lines using a heating coil permanently installed within the tank for heating its contents. Such heating devices, however, waste large amounts of heat by heating the contents of the entire tank to unfreeze the small volume of frozen or solidified material within the well line. Further, this procedure is annoyingly slow and requires repeated attempts by an operator to probe into the well line with a rod or the like to determine when its contents are fully thawed. Other devices have also been made to unthaw the frozen contents of a line by discharging hot fluid directly in the line. Such devices suffer the defect of permitting contamination of the tank contents with the hot fluid. Advantageously, this invention provides a heater which can readily thaw such frozen lines and which avoids many of the problems of the prior art devices.

This invention contemplates a tubular fluid heater that can be readily inserted into and agitated within pipe lines and like members for thawing frozen materials therein. In particular this invention is directed to a light-weight thawing device heated by fluids which has an outer elongated closed pipe-like casing or shell with an effective diameter substantially smaller than the pipe line or like into which the heater is inserted so that the heater can be agitated or stirred from side to side within the pipe line to break up and to thaw the frozen material therein.

In addition, this invention also contemplates a method for thawing frozen materials within pipes and the like which comprises inserting a heated tubular thawing device within a pipe having material frozen therein, agitating or stirring said heater from side to side within said pipe to break up and to cause rapid thawing of the surrounding frozen material, and thereafter further inserting and effecting agitation with said device until the entire length of the pipe is free of frozen material.

As used herein the terms "freeze" or "thaw" have reference to the change of state of a liquid to a solid condition or vice versa.

In accordance with this invention the fluid thawing device is an elongated tubular heater with fluid inlet and outlet means at one end and inner fluid conducting means for directing heated fluid from the inlet means down through substantially the entire length of the heater before the fluid is returned along the entire inner surface of the casing and through the outlet means so that the whole length of the heater is uniformly heated.

Furthermore, because of the relatively small diameter of the heater of this invention the weight of heating fluid contained therein is kept to a minimum, thus facilitating the portability of said heater. Also in order to further enhance the portability of said heater and facilitate agitation within the frozen line, flexible hoses or the like are attached to the inlet and outlet means.

Advantageously the outer tubular shell or casing can be formed of metal pipe and provided at each of its ends with closure means, e.g. metal pipe caps, so that the outer shell is thereby constructed from a minimum number of high strength components, and also has a strong tip at the lower end. With this construction the heater tip can be slammed or pressed against frozen material in a pipe line by applying force at the upper end to effect more rapid thawing of frozen material.

The inner fluid conducting means of the invention is a tubular member formed of material lighter in weight and strength than the outer tubular member. Also with advantage the inner member may be extended down within the heater axially offset from the longitudinal center axis of the casing. This arrangement produces a longitudinal space between inner member and the casing to avoid restricting free flow of fluid through the heater and thus provide rapid heat transfer through the casing.

Where the pipe line to be freed of frozen material is angled or curved, portions of both the inner tubular member and the outer casing can be formed of flexible metallic materials. Usually additional internal supports are necessary when flexible tubing is used to maintain the inner member in a fix position relative to the casing.

With the heater of this invention it has been found possible in practice to free a well line of a tank car of frozen material in a very short time, that is from a few minutes to less than one hour. Discharge of liquids from tanks where the contents of unloading well line are partially or fully frozen is thereby greatly facilitated and the delays and expense in use of other means for thawing the line is avoided. Moreover, because the outer shell has no obstruction laterally extending outwardly along its length the operator can view along the length of the device to easily align the heater with entrance to the well line.

Other objects and advantages of the apparatus of this invention will be apparent from the appended drawings and detailed description of an embodiment thereof, it being understood that such embodiment is shown by way of illustration only in which:

FIGURE 1 is a section view in elevation of my heater shown partially within a tank well line containing frozen material, FIGURE 2 is a view in elevation shown in partial section of a portion of a tank car having a filling well line and showing an external view of my heater in position for use and in dotted lines shown positioned within a tank well line; and FIGURE 3 is a top plan view taken along line 3—3 of FIGURE 1.

Referring to the drawings, heater 10 as best seen in FIGURE 1, is shown partially positioned in a tank unloading well line 12 with its lower end extending through thawed liquid 14 and in contact with frozen material 16 within the line. Heater 10 has an outer tubular casing or shell 18 formed of a straight length of rigid standard weight black iron pipe. The tubular casing is provided with a bottom cap 20 which closes its lower end and a top cap 22 closes its upper end. The caps may also be similar to the casing material.

In general, it is preferred that the outer casing has an effective outside diameter, which will be of such size as to allow from about ½ inch to 2 inches clearance around the casing to allow the heater to be stirred or agitated from side to side within the member to be freed of frozen material. For example, I have found the ½ inch nominal size standard pipe particularly effective in tank filling well lines having a 2 inch diameter size. For the purpose of attaching the caps the tubular body may be externally threaded at its upper and lower ends 26 and 28 respectively with threads 30 and 32 using suitable standard pipe threads. After the caps have been threaded into place the resulting joints can be sealed by circumferential welds 38 and 40. It will be appreciated that instead of using threads as outlined, the caps may slip fit over unthreaded ends of the body and secured by welding or the like. It also will be appreciated that the bottom cap 20 can be made of stronger material than the casing so that it is particularly useful for repeated contact with frozen material as by probing and like operation.

The inner tubular member 42 is preferably formed of copper tubing commonly available for the plumbing and steam fitting trade. This tubing is a lighter weight material having less structural strength than the material of the casing 24. When the outer casing is of ½ inch size, it is preferred that the copper tube be ¼ inch size such as plumbers type L, K or M. The tubing is inserted through an opening 44 in the cap 22 at the top end of the heater casing. The copper tubing may be circumferentially welded, brazed or soldered or otherwise sealed as indicated at 48. The inner tubular member extends inside the casing substantially the full length of the heater so that its lower end 50 is from about ½ inch to about 2 inches from the bottom of end of the casing. A spider support 54 of any suitable material may be used to steady and position the tube in a known manner within the casing at the lower portion of the heater. The spider thus prevents the end 50 of the tubing from being displaced by arms 56 which are located so as not to interfere substantially with the flow of heating fluid through the heater. The spider may be omitted in some cases.

It will be observed by reference to FIGURES 1 and 3 that the inner tubular member 42 is connected through the cap 22 and is led down through the heater casing so that its central axis 58 is offset from the axis 60 extending centrally of the heater casing. Member 42 is thus positioned closely toward one side 62 of the heater body and away from its opposite side 64 to leave a space 66 having a large cross sectional area as shown for non-restrictive free flow of the heating fluid in passing up through the heater body.

It will be appreciated that the outer shell of the heater which may be from several feet to many feet in length, is preferably constructed of high strength metals, i.e., ferrous alloys and the like; thus giving the heater shell sufficient strength to withstand repeated use as when it is agitated or stirred within the well line or handled abusively by workers or operators using it. It will be appreciated that non-ferrous metals, for example, brass or bronze pipe may also be used for the casing but these metals may not withstand abuse as well. Moreover, corrosion resistant alloys, i.e., stainless steel or the like may be used when the heater is used to thaw highly corrosive liquids.

Use of relatively thin walled copper tubing with its inherent high coefficient of heat transfer for the inner tubular member provides not only a saving in weight over heavier and stronger materials so that the heater is light for ease of handling by the operator but also provides greater thermal efficiency in the heater. It will be comprehended that the high coefficient of thermal conductivity of the inner tubular member will tend to maximize heat transfer from the hot fluid flowing down through the member 42 to the fluid flowing up between inner member and the casing. In this manner, the heat available from the entire length of the heater casing will be more uniform.

At the upper end of the heater, portion 68 of the inner tubular member, which may if desired be a separate fitting, is curved to extend outwardly from the top end 46 at a location close to the top end (best seen in FIGURE 1). A quick coupling hose connection 70 may be affixed to member 42 so that a flexible inlet hose 72 can be attached for conducting steam or hot water into the heater and through member 42. A fluid outlet is provided by nipple 74, positioned in opening 76 in the casing wall. The nipple is circumferentially sealed to the casing at 78 by welding, soldering, brazing or the like. A quick coupling hose connection 80 is affixed to the nipple and permits removable attachment thereto of flexible discharge hose 82. The hose 82 is provided for conducting the heating fluid away from the heater so as to discharge it at a point remote from the well line. Inlet and outlet flexible hoses 72 and 82 are of any suitable materials but are desirably light in weight. In practice the hoses may further be provided with shut-off valves (not shown) for control by the operator of the flow of the hot fluid through the heater.

In operation, heat is supplied to the heater by a heated fluid such as steam, hot water or the like from a source (not shown) the fluid being passed downwardly into the inner tube and upwardly through the space defined by the casing and the inner tube in a path indicated by the arrows in FIGURE 1. Hot fluid thus passes through hose 72 and then down within the inner tubular member 42 to exit from its open end 50 very close to end tip 52 of the casing. After discharging from the end 50, the hot fluid reverses its direction of flow and passes up through space 66 between the inner tubular member 42 and the walls of casing 18 and thereby heat the outer surface of the casing by both convection and conduction. The fluid is then discharged through opening 76 in nipple 74 and through hose 82. It will be appreciated that the particular inner and outer tubular construction of the heater tends to heat it evenly along its length with great effectiveness for heat transfer at its lowermost end through end tip 52. It will be appreciated that in some instances when it is desired to cause the tip of the heater to become hotter, the inner member 42 may be made of less heat conductive material.

The construction of the heater having been described its process of use is as follows: In FIGURE 2 there is partially shown a railroad tank car 84 supporting a tank 86 containing normally liquid material. The tank is shown partially cut away to better reveal its relatively small diameter unloading well line 12. The well line extends from its entrance opening 88 exterior to the tank vertically within the tank car so its open lower terminal end 90 terminates just above the bottom 92 of the tank. A strainer 94 which may include support structure for the well line is shown in surrounding relationship to its lower terminal end. Heater 10 is illustrated in FIGURE 2 as held in position 96 ready to be inserted into the well line and also in position 98 after its insertion into the well line has been accomplished by agitation of the heater into the line to thaw the well line contents.

In use, an operator grips the heater in any convenient manner but preferably using holders 102 which are insulated against heat transfer, positions the heater vertically above the well line and then inserts the heater into the well line through its opening 88. The operator presses tip 52 firmly down against frozen material 16 in the line. Heat and pressure of the heater on the frozen material melts it and thus allows the heated tip to be agitated by the operator down the full length of the well line to position 98 which may be beyond its terminal end 90 as illustrated in FIGURE 2. The entire length of the heater below the hose connections is effective for transferring heat evenly to material in the length of the line. Heat is thus applied to and within the well line as well as beyond its terminal end so that line 12, its appurtenant structure including the strainer 94 and areas adjacent thereto are fully freed from frozen material to place the interior of the well line in open communication with the liquid in the tank. Then the liquid can be unloaded from the tank in a known manner through the open line. The strength and pipe-like casing of the heater both allow the heater to be easily handled and agitated or stirred by the operator about the interior of the line to rapidly thaw any pockets of material frozen therein.

It will thus be appreciated that this invention provides a handy portable heater light enough in use to be easily lifted by an operator and inserted into the ordinary narrow diameter tank well line or which may be used to thaw lines of even smaller diameters.

In general, the outer diameter of the casing may vary from about ½ inch to about 2½ inches nominal size standard iron pipe, with the smaller sizes providing greater ease of handling. Reference may be had to standard tables for the dimensions and weights of pipe within the acceptable sizes. These show, for example, that in the case of standard steel pipe, dimensions and weights range from in the ¼ inch nominal size (internal diameter) pipe, about .540 inch outside diameter, about .36 inch internal diameter, wall thickness about .088 inch and weight about .42 pound per foot of length to in the 2 inch nominal size (internal diameter) pipe, about 2.375 inches external diameter, about 2.07 inches internal diameter, wall thickness about .154 inch and weight about 3.65 pounds per foot of length. In the specific embodiment of the invention set forth above, the ½ inch pipe has an outside diameter of about .840 inch, inside diameter about .62 inch, wall thickness of about .109 inch and weight of about .85 pound per foot of length. It will also be seen from standard tables that outside diameters of brass and copper pipe are the same as for iron (steel) pipe although wall thickness may differ in some sizes and weight per foot differs.

Tubing used for the inner tubular member may be any of the tubings suitable for the fluid pressures and temperatures used but preferably of rapid heat transferring ability. Brass may be used for example but copper is preferred. Reference may be had to standard tables for dimensions and weights of the suitable sizes. These will show that with copper tubing of types K, L and M, for example, such dimensions and weights range from ⅛ inch nominal size having an outside diameter of about .250 inch, wall thickness about .025 inch and weight about .068 pound per foot length to ⅝ inch nominal size having outside diameter of about .750 inch, wall thickness of about .049 inch and weight about .418 pound per foot of length. Certain seamless drawn brass and copper tubing may have slightly different dimensions and weights. In the specific embodiment of the invention set forth above the inner tubular member may be type L copper tubing ¼ inch nominal size having outside diameter .375 inch, wall thickness .030 inch and weight .126 pound per foot of length.

Where flexible materials are used to produce my heater it may be formed entirely or partially of such materials as for example braided, wound, coiled, or other metal tubing. However, when flexible materials are used one or more end portions of the heater may be formed of inflexible materials. In the latter case the lower end tip may be inflexible or the upper portion of the heater carrying the hose connections may be of inflexible material or both.

Under the concepts of this invention the tubular and outer casing forming the heater is of a sufficient length, but of such outer diameter that the heater fits freely into the length of the long narrow well lines encountered, while lightness and reduction of operator effort are obtained by using heated gases or relative small total amounts of heating fluids such as water and condensate within the heater at a given instant. Thus, the thawing capacity of the heater is kept to a maximum by use of heating fluids having high velocity flow and high temperatures.

Furthermore, it will be appreciated that the total weight of the heater, when in use, can range from a few to several pounds, i.e., about four to fifty pounds, depending on the type of heated fluid employed, as well as on the dimensions of the heater and on the amount of condensate or the like in the heater. In general, the heated fluids suitable for the present invention include steam, hot exhaust gases from internal combustion engines or the like, hot water and the like.

It is also within the contemplation of my invention to form the heater external shell and any or all connections thereto of non-sparking metals as for example bronze pipe or other metals of any suitably strong composition and to use various shapes for the lower end tip as for example pointed, domed or other shapes.

The heater of this invention can also be sealed into a bung or other flexible stopper devices so as to permit sealing of the heater into casks and the like for heating the cask contents while preventing entrance of air into the cask.

Although the present invention has been described with particularity with reference to a preferred embodiment, it will be obvious to those skilled in the art, after understanding the invention, that various changes and modifications may be made therein without departing from the spirit and scope of the invention, and the appended claims should therefore be interpreted to cover such changes and modifications.

What is claimed is:

1. In combination, a tank containing freezable liquid, a tank well line which contains frozen liquid therein for removing liquid from the tank, said well line extending from near the top of said tank to near the bottom of said tank and in open communication with the liquid in the tank, and a pipe-like heater inserted into said well line, and supplied witht heated fluid from an external source, said heater comprising an outer elongated casing closed at both ends, an inner tubular member supported within and extending from the upper end to closely adjacent the lower end of said casing, said member being arranged in said casing toward one side thereof to provide a relatively large unobstructed flow path therein, inlet means connected to said member and outlet means connected to said casing whereby heated fluid can be passed in through the inner tubular member and out through said flow path to effect uniform and rapid heating of the exterior of said casing, said casing having an effective diameter substantially smaller than said well line and said inlet and outlet means having flexible fluid connections for passing heated fluid to and from said heater whereby said heater can be agitated from side to side within said conduit to promote casing, the lower end of the inner tubular member being of a length sufficient to extend from the top of said well line to near the bottom of the tank whereby said heater may be inserted into the full length of the well line to thaw liquid frozen therein and to thereby allow free flow of liquid from the tank through said well line.

2. In combination, an opened conduit containing frozen material therein, a fluid heater inserted into said conduit for thawing said frozen materials and an external source for supplying heated fluid to said heater, said heater comprising an outer, elongated pipe-like casing closed at its upper and lower ends and having an effective diameter substantially smaller than said conduit whereby said heater can be agitated from side to side in said conduit to promote rapid thawing of said frozen material, an inner tubular member supported within and extending from the upper end to closely adjacent to the lower end of said casing, the lower end of the inner tubular member being open and in communication with the interior of said casing, said tubular member being arranged more closely adjacent to one side of the inner wall of the casing to provide a relatively large unobstructed flow path within the interior of the casing, fluid inlet means connected to the upper end of the tubular member, flexible means for conveying a heated fluid from said external source into said fluid inlet means, fluid outlet means connected to the upper part of the casing and flexible means for conveying the spent heated fluid from said output means whereby heated fluid from said external source is passed into the heater, down through the inner member and upwardly through the interior of the casing and discharged therefrom to effect uniform and rapid heating of the exterior surface of the outer casing along its total length and to thereby rapidly thaw said frozen material.

3. The heater of claim 1 in which said inner tubular member has an effective diameter substantially smaller than the internal diameter of the casing to define a relatively large unobstructed space within the interior of the casing whereby the heating fluid can be rapidly discharged from said casing and thus promote a high rate of heat transfer from said heater.

References Cited by the Examiner

UNITED STATES PATENTS

| | | | |
|---|---|---|---|
| 1,511,056 | 10/1924 | Ercanbrack | 165—142 |
| 2,274,066 | 2/1942 | Jacocks | 165—142 X |
| 2,376,373 | 5/1945 | Merckel | 165—86 |
| 2,669,435 | 2/1954 | Cord et al. | 165—142 |
| 2,672,032 | 3/1954 | Towse | 165—142 X |
| 3,170,227 | 2/1965 | Richmond et al. | 165—142 X |
| 3,194,229 | 7/1965 | Borgeson | 126—360 |

MEYER PERLIN, *Primary Examiner.*

ROBERT A. O'LEARY, *Examiner.*

T. W. STREULE, *Assistant Examiner.*

UNITED STATES PATENT OFFICE
CERTIFICATE OF CORRECTION

Patent No. 3,319,709                                May 16, 1967

Roy S. Strunk

It is hereby certified that error appears in the above numbered patent requiring correction and that the said Letters Patent should read as corrected below.

Column 6, line 58, strike out "casing, the lower end of the inner tubular member" and insert instead -- rapid thawing of frozen liquid therein, said heater --; column 7, line 10, for "output" read -- outlet --.

Signed and sealed this 3rd day of September 1968.

(SEAL)
Attest:

Edward M. Fletcher, Jr.                        EDWARD J. BRENNER
Attesting Officer                                    Commissioner of Patents